Feb. 24, 1925.
H. KATTER
HOG FEEDER
Filed Feb. 26, 1924    2 Sheets-Sheet 1
1,527,653
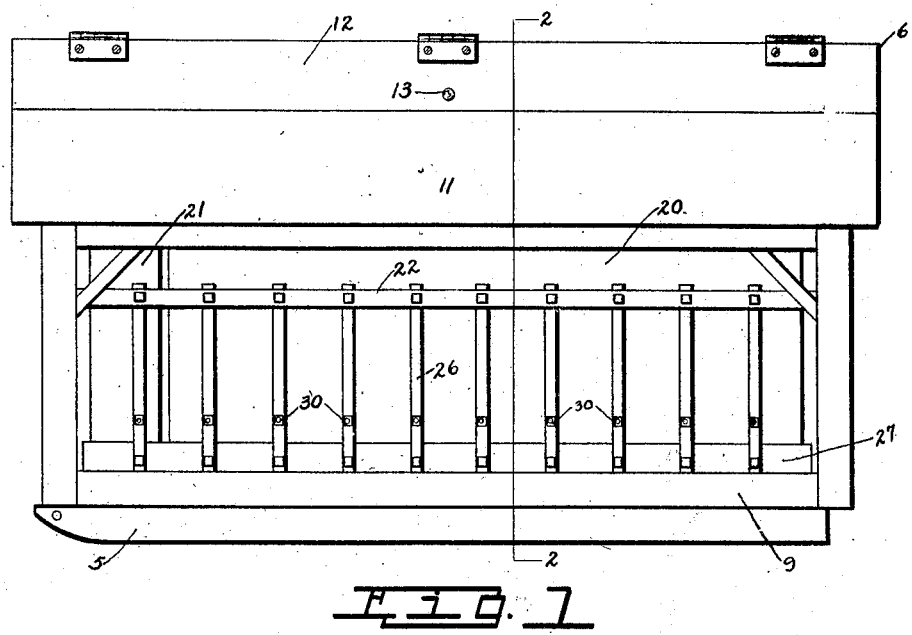
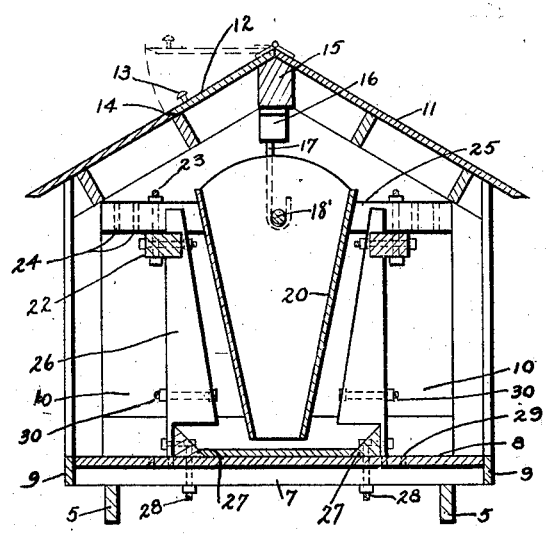
Inventor
Henry Katter
By
J. B. Dickman Jr.
Attorney Feb. 24, 1925.
H. KATTER
HOG FEEDER
Filed Feb. 26, 1924   2 Sheets-Sheet 2
1,527,653
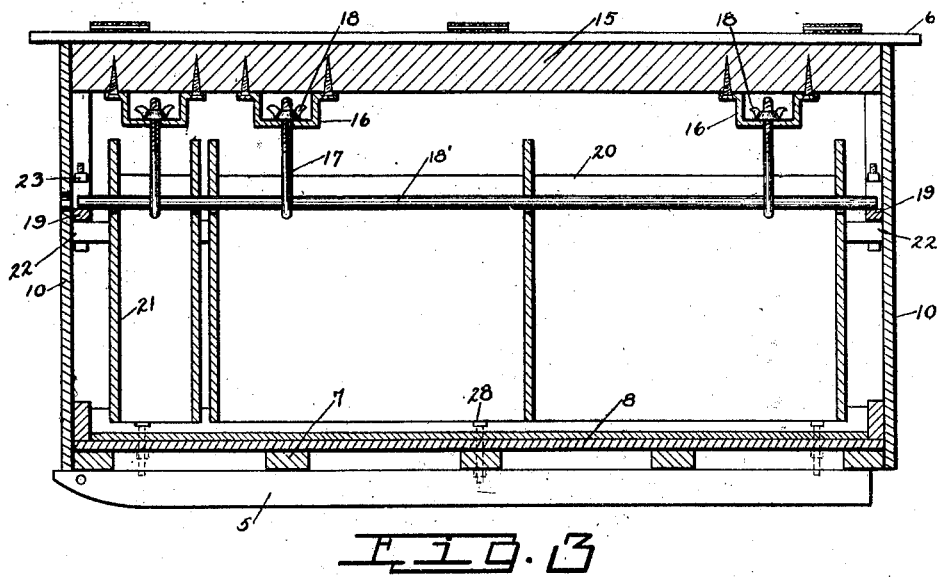
$\mathit{FIG.3}$
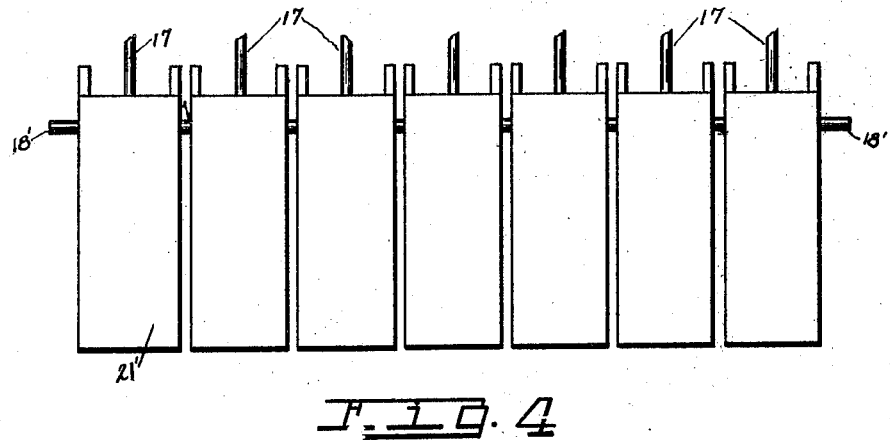
$\mathit{FIG.4}$
Inventor
Henry Katter
By
J.B.Dickman
Attorney Patented Feb. 24, 1925.

1,527,653

UNITED STATES PATENT OFFICE.

HENRY KATTER, OF MOULTON TOWNSHIP, AUGLAIZE COUNTY, OHIO.

HOG FEEDER.

Application filed February 26, 1924. Serial No. 695,331.

*To all whom it may concern:*

Be it known that I, HENRY KATTER, a citizen of the United States, residing at Moulton Township, in the county of Auglaize and State of Ohio, have invented certain new and useful Improvements in Hog Feeders, of which the following is a specification.

The present invention consists of a hog feeder, an object of which is to provide a mobile structure to permit convenient transportation of the same from one field to another or from one pen to another for the purpose of feeding hogs with convenience and facility and maintaining the food free from contamination or exposure to the elements.

A further object of the invention is to provide a hog feeder embodying a feed hopper which is moved by the hogs during feeding in order to scatter the food over a predetermined area of the feeder floor, the invention embodying suitable means for adjusting the hopper vertically to control the volume of the feed gravitating from the hopper.

A still further object of the invention is to provide a feed hopper movable laterally by the hogs to dispense the feed from the hopper, suitable means being provided to restrain the hogs from entering the part of the feeder where the feed is deposited, the same means also capacitating as abutments for limiting the lateral movement of the hopper.

Other objects of the invention will be apparent from the following description of the forms of the invention hereinafter described in the specification and shown in the accompanying drawings wherein:

Fig. 1 is a side elevational view of a hog feeder constructed in accordance with this invention;

Fig. 2 is a transverse sectional view taken on the line 2—2 of Fig. 1;

Fig. 3 is a longitudinal sectional view of the feeder; and

Fig. 4 is a detail fragmentary elevational view of a modified form of feeding hoppers.

The present invention consists of a pair of runners 5 upon which a superstructure is mounted, the superstructure in the present instance consisting of an oblong housing generally designated 6.

The housing 6 preferably embodies a pair of supporting beams 7 arranged transversely across and secured to the runners 5. The beams 7 carry the bottom 8 of the housing, the lateral margins of which have side sills 9 secured thereto and also engaged with the terminals of the beams 7. The ends of the housing, designated 10, are secured to the ends of the flooring 8 and depend below the latter for engagement with certain of the beams 7 as shown in Fig. 3 of the drawings. The upper terminals of the end walls 10 are preferably of gable construction upon which a roof 11 is mounted. A portion of the roof is hinged to provide a closure 12 through which access may be gained to the interior of the housing. The closure 12 is equipped with a knob 13 to facilitate movement of the closure. Moreover, the free margin of the closure 12 is beveled and the corresponding margin of the roof beveled, as indicated at 14, to interfit and reduce the possibility of the elements entering the housing to a minimum.

Mounted directly beneath the apex of the roof 11 and fixedly secured thereto is a rafter 15 upon the lower face of which a plurality of loop straps 16 are detachably mounted. Each of the loop straps has a hook 17 detachably mounted therein. Each hook embodies a theaded shank which extends into one of the loop straps and has a wing nut 18 mounted on the free end thereof. The bills of the hooks 17 carry a shaft 18′ the ends of which latter are rotatably mounted on bearings 19 which are adjustably mounted on the inner faces of the end walls 10. The shaft 18′ is shown in Fig. 3 of the drawings as extending longitudinally through a relatively long hopper 20 and through a relatively short hopper 21. In Fig. 4 of the drawings, a slight modification is shown which consists in employing a series of relatively small hoppers 21′ to be used instead of the hopper 20. The hoppers 20 and 21 are swingingly mounted on the shaft 18′ as are also the hoppers 21′. The upper ends of the hoppers 20, 21 and 21′ are adapted to lie directly beneath and in close proximity to the closure 12 so that when the latter is open, food for the hogs may be deposited through the roof into said hoppers. The lower ends of the hoppers are appreciably spaced from the floor 8 of the feeder housing to permit the feed deposited in the hopper to gravitate through the lower end of the hopper and spread laterally on the floor 8 beyond the sides of the hoppers.

By adjustably mounting the hooks 17 in the loop straps 16 the hoppers may be vertically adjusted to increase or diminish the volume of feed gravitating through the lower ends of the hoppers. It is the purport of the present invention to employ the hopper 20 for the usual feed to be given the hogs and to reserve the hopper 21 for medicaments, salt, tankage or the like.

By preference, a series of stanchions are mounted on each side of the troughs as illustrated in Figs. 1 and 2 of the drawings. Each series of stanchions embodies a bar 22 which extends longitudinally through the housing and is equipped with a bolt 23 in each terminal thereof which is engageable through anyone of a series of openings 24 formed in bars 25, one of which latter extends transversely across each end of the housing. Stanchions 26 are detachably engaged with the bars 22. The inner face of each stanchion is disposed at an inclination so that the space between the opposed series of stanchions is of a truncated cone shape to complement the configuration of a cross section taken through any one of the hoppers 20, 21 and 21'. The inner faces of the stanchions are spaced from the outer faces of the hoppers to permit limited lateral movement of the hoppers. The latitude of movement may be varied by adjustment of the stanchions 26. It is apparent that the bolts 23 may be adjusted to correspondingly move the bars 22. Inward movement of the lower ends of the stanchions is prevented by abutments 27 which are detachably engaged with the floor 8 by bolts 28. The abutments 27 are engaged in recesses formed in the lower ends of the stanchions. Each bolt 28 may be engaged in any one of a series of openings 29 formed in the floor 8 in order to adjust the abutments 27 in correspondence with the adjustment of the bars 22. By preference, each stanchion is reinforced by a bolt 30 which latter extends through the stanchion adjacent its lower end.

From the above it is apparent that a feeder constructed in accordance with this invention may be transported with facility. Moreover, the construction of the feeder enables the hogs to gain access to the feed with facility. However, possibility of the hogs trampling the feed is reduced to a minimum by the employment of the stanchions 26. The space between the abutments 26 constitutes a trough for the reception of the feed, and, of course, as above recited, the hoppers may be vertically adjusted so as to adjust the volume of feed passing into the trough. The means herein employed for suspending the hoppers not only permits convenient adjustment of the hoppers, but likewise permits expeditious removal of the latter when it is desired to clean the feeder or repair or replace any of the parts of the latter.

Although two different forms of the invention are herein described it is nevertheless to be understood that various other modifications of this invention may be made without departing from the scope of the appended claims. Moreover, various changes may be made in the size and shape of the device and the material from which it is constructed without departing from the scope of the present invention.

What is claimed is:—

1. A hog feeder including runners equipped with a superimposed housing, a hopper swingingly mounted in said housing and vertically adjustable to adjust the volume of feed gravitating from the latter, and stanchions mounted in said housing on each side of the hopper to limit swinging movement of the latter, said stanchions being laterally adjustable to increase or diminish the latitude of movement of said hopper.

2. A hog feeder including a housing, a feed hopper swingingly mounted in said housing and stanchions mounted in said housing on opposite sides of the hopper to restrain the hogs, said stanchions adjustable to control the extent of lateral movement of said hopper.

In testimony whereof I affix my signature.

HENRY KATTER.